E. A. SCHMITT.
LIGHTNING ROD COUPLING.
APPLICATION FILED DEC. 23, 1914.

1,163,181.

Patented Dec. 7, 1915.

WITNESSES:
Charles A. Becker
G. M. Shorr

INVENTOR
Eugene A. Schmitt
BY
E. E. Huffman
ATTORNEY

COLUMBIA PLANOGRAPH CO., WASHINGTON, D. C.

UNITED STATES PATENT OFFICE.

EUGENE A. SCHMITT, OF GREENCASTLE, INDIANA, ASSIGNOR TO COLE BROTHERS LIGHTNING ROD COMPANY, OF ST. LOUIS, MISSOURI, A CORPORATION OF MISSOURI.

LIGHTNING-ROD COUPLING.

1,163,181. Specification of Letters Patent. Patented Dec. 7, 1915.

Application filed December 23, 1914. Serial No. 878,679.

*To all whom it may concern:*

Be it known that I, EUGENE A. SCHMITT, a citizen of the United States, residing at the city of Greencastle, in Putnam county, Indiana, have invented a certain new and useful Lightning-Rod Coupling, of which the following is such a full, clear, and exact description as will enable any one skilled in the art to which it appertains to make and use the same, reference being had to the accompanying drawings, forming part of this specification.

My invention relates to means for coupling together lightning rod sections to form a firm mechanical joint and also a good electrical connection between them, and constitutes an improvement on the coupling means described in United States Patent No. 297,290 to Patee, whereby a firmer mechanical joint may be readily formed between the coupling elements and the rod section and also particularly a better electrical joint without the necessity of making the connector longer.

Figure 1:
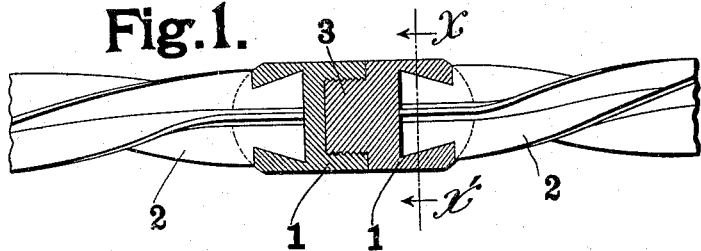
Figure 2:
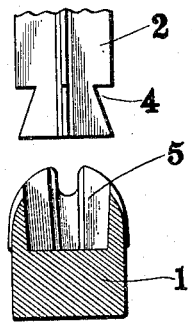
Figure 3:
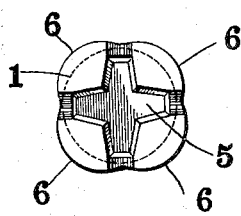
Figure 4:
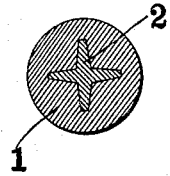

In the accompanying drawings, which illustrate one embodiment of my invention, Figure 1 is a view partly in elevation and partly in section, showing the complete coupling; Fig. 2 is a view of the end of the flanged rod section and of the connecting member before being applied to the rod, the latter being shown in section; Fig. 3 is a top plan view of the connector as cast and before application to the rod; Fig. 4 is a cross section along the line $x$—$x'$ of Fig. 1.

1 represents a metal connector, preferably of copper, designed to be attached to the end of a flanged lightning rod section 2 and is provided with either a threaded recess or complementary threaded projection 3 whereby two connectors may be detachably joined. The threads are formed on the connectors after the same are applied to the rod section.

Fig. 3 is a plan view of the connector as cast and ready for application to the end of a rod section, 5 representing the recess in which the rod section is inserted and conforming in shape thereto. The connector is provided with excess metal at the points 6 and the end of each rod section is provided with depressions and projections, for instance, by forming the notches 4 therein. After having been applied to the rod, the metal is pressed and swaged into close contact therewith, the shape of the recess 5 and the excess metal 6 permitting the bringing of the metal of the connector into intimate contact with a large surface of the rod and entering the notches 4, thus, at the same time, forming a smooth firm mechanical joint and also a good electrical joint.

Fig. 4 shows the position of the metal of the connector with reference to the rod section after application.

Having fully described my invention, what I claim as new and desire to secure by Letters-Patent of the United States is:

1. A metal connector for lightning rod sections provided with an angular recess in one end for the reception of the end of a flanged rod section and before application to the rod substantially conforming in cross section throughout its depth with the cross section of said rod, said connector being also provided with excess metal adjacent to said recess, whereby the connector may be swaged into an intimate contact with a relatively large area of the surface of the rod section to form a firm mechanical and a good electrical joint.

2. The combination of a flanged lightning rod section having depressions and projections on the flanges adjacent to their ends, and a connecting member of electrically conductive material having a recess in one end conforming throughout its depth to the shape of the rod section and of sufficient depth to include the depressions and projections on the rod whereby a large contact area between the rod and connector is provided and firm mechanical connection is secured.

In testimony whereof, I have hereunto set my hand and affixed my seal in the presence of the two subscribing witnesses.

EUGENE A. SCHMITT. [L. S.]

Witnesses:
 EDGAR L. HARRIS,
 BENJ. F. CORWIN.

Copies of this patent may be obtained for five cents each, by addressing the "Commissioner of Patents, Washington, D. C."